United States Patent [19]

Harashima

[11] Patent Number: 5,696,192
[45] Date of Patent: Dec. 9, 1997

[54] ORGANOPOLYSILOXANE BEARING POLYOXYALKYLENE BONDED TO SILICON ACROSS ALKYLENE AND METHOD OF PREPARATION

[75] Inventor: Asao Harashima, Tokyo, Japan

[73] Assignee: Dow Corning Toray Silicone Co., Ltd., Tokyo, Japan

[21] Appl. No.: 749,451

[22] Filed: Nov. 15, 1996

[30] Foreign Application Priority Data

Nov. 24, 1995 [JP] Japan ................................. 7-329529
Mar. 27, 1996 [JP] Japan ................................. 8-099040

[51] Int. Cl.$^6$ ....................................................... C08K 5/06
[52] U.S. Cl. ........................... 524/366; 524/367; 524/369; 524/376; 524/379; 524/383; 524/386; 524/384; 524/405; 524/415; 556/479; 528/15
[58] Field of Search ............................. 528/15; 524/379, 524/383, 376, 386, 384, 366, 367, 369, 415, 405; 556/479

[56] References Cited

U.S. PATENT DOCUMENTS 5,118,764  6/1992  Ichinohe et al. ........................ 525/398
5,288,831  2/1994  Ichinohe et al. ........................ 528/25

*Primary Examiner*—Melvyn I. Marquis
*Attorney, Agent, or Firm*—James L. Decesare

[57] ABSTRACT

A polyoxyalkylene-modified organopolysiloxane that generates almost no odor with the passage of time, and a method for preparation of the polyoxyalkylene-modified organopolysiloxane. This organopolysiloxane bears polyoxyalkylene bonded to silicon across alkylene, and contains 5–1,000 ppm by weight of an antioxidant. It also has a peroxide value not exceeding 5 meq/kg, and a total content of aldehyde plus ketone not exceeding 100 ppm.

18 Claims, No Drawings

1

ORGANOPOLYSILOXANE BEARING POLYOXYALKYLENE BONDED TO SILICON ACROSS ALKYLENE AND METHOD OF PREPARATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates to an organopolysiloxane carrying polyoxyalkylene bonded to silicon across alkylene, and is hereinafter referred to as a "polyoxyalkylene-modified organopolysiloxane". More particularly, this invention relates to an odorless polyoxyalkylene-modified organopolysiloxane that does not generate odor with elapsed time. The invention also relates to methods for preparing this polyoxyalkylene-modified organopolysiloxane.

Polyoxyalkylene-modified organopolysiloxanes synthesized by platinum-catalyzed addition between organohydrogensiloxanes and alkenyl-monoterminated polyoxyalkylenes are used as base oils for cosmetics due to their excellent feel upon contact with human skin, and excellent spreadability during application.

Unfortunately, these polyoxyalkylene-modified organopolysiloxanes readily produce odor with the passage of time, and ultimately emit an unpleasant odor after extended periods of standing. In response to this problem, Japanese Patent Application Laid Open [i.e., Kokai or Unexamined] Hei 2-302438/302,438/1990 (and its United States equivalents U.S. Pat. No. 5,118,764 and U.S. Pat. No. 5,228,831), propose a polyoxyalkylene-modified organopolysiloxane that is almost free of odor generation with the passage of time, and a method for preparation of the polyoxyalkylene-modified organopolysiloxane.

The Japanese Patent Application provides a polyoxyalkylene-modified organopolysiloxane that produces no more than 1,000 ppm total ketone plus aldehyde when treated under seal with $10^{-4}$ N aqueous hydrochloric acid at 60° C. for 24 hours. The Japanese Patent Application also provides a preparative method of first treating a conventional polyoxyalkylene-modified organopolysiloxane with an acidic substance, or an aqueous acid solution having a pH less than or equal to 7, to force production of odor substances, and subsequently eliminating the odor substances produced.

This treatment with aqueous acid solution or an acidic substance has disadvantages. Thus, residual acid or acidic substance remains present, and a thorough washing with water is necessary to eliminate these residues. Moreover, even the resultant polyoxyalkylene-modified organopolysiloxane develops odor when held for a long period of time, preventing its use in some cosmetic applications.

To solve this problem, I have discovered that not only must the quantity of ketone and aldehyde not exceed a particular level, but that the peroxide value must not exceed a particular level. It has also been determined that additional beneficial effects can be obtained by addition of a small amount of an antioxidant.

BRIEF SUMMARY OF THE INVENTION

The object of my invention is to provide an odor-free polyoxyalkylene-modified organopolysiloxane, and more particularly, a polyoxyalkylene-modified organopolysiloxane which produces almost no odor with the passage of time.

Another object of my invention is to provide a method for preparing the polyoxyalkylene-modified organopolysiloxane.

These and other features and objects of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

My invention relates to organopolysiloxanes bearing polyoxyalkylene bonded to silicon across alkylene that contain from 5 ppm to 1,000 ppm by weight of an antioxidant, have a peroxide value not exceeding 5 meq/kg, and a total content of aldehyde plus ketone not exceeding 100 ppm.

It also relates to a method for preparing the organopolysiloxane bearing polyoxyalkylene bonded to silicon across alkylene. The method comprises conducting a hydrosilylation reaction in an organic solvent between (A) a polyoxyalkylene bearing alkenyl at a single terminal, having a peroxide value not exceeding 3 meq/kg, and a total content of aldehyde plus ketone not exceeding 100 ppm by weight, and (B) an organohydrogenpolysiloxane that contains at least one silicon-bonded hydrogen atom, in the presence of (C) a platinum catalyst; removing the organic solvent under reduced pressure; then blending in a quantity of water that is at least one weight percent of the total of components (A) and (B), subsequently eliminating the water under reduced pressure; and thereafter adding from 5 ppm to 1,000 ppm antioxidant, and optionally from 1 ppm to 500 ppm buffer having a pH from 5.5 to 8 when dissolved in water.

The polyoxyalkylene-modified organopolysiloxane according to my invention must contain from 5 ppm to 1,000 ppm antioxidant, and preferably contains from 10 ppm to 400 ppm antioxidant.

The nature of the antioxidant is not critical, as long as it has the capacity to inhibit oxidation of the polyoxyalkylene. The antioxidant is exemplified by vitamins such as vitamin $D_2$, vitamin $D_3$, vitamin $D_4$, and vitamin E; and hindered phenols such as 2,6-di-tert-butyl-p-cresol, 4,4-dihydroxyphenylisopropane, and 4,4-thiobis(6-tert-butyl-m-cresol). Vitamin E is most preferred.

The peroxide value must not exceed 5 meq/kg, since odor will be produced with the passage of time when the peroxide value exceeds 5 meq/kg. Moreover, the total quantity of aldehyde plus ketone must not exceed 100 ppm.

The type of polyoxyalkylene-modified organopolysiloxane used in my invention is not critical as long as it is an organopolysiloxane bearing polyoxyalkylene bonded to silicon across an alkylene radical. Such polyoxyalkylene-modified organopolysiloxanes include compounds defined by the following general formulas:

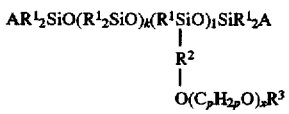

where $R^1$ denotes a monovalent hydrocarbon group; $R^2$ is alkylene; $R^3$ is a hydrogen atom, a lower alkyl group, or an acyl group; A is $R^1$ or a group defined by the general formula $-R-O(C_pH_{2p}O)_xR^3$; k is zero or a positive integer; l is zero or a positive integer; p is an integer with a value from 2 to 4; x is an integer with a value from 1 to 100; with the proviso that when l is zero, at least one of the groups A has the formula $-R^2-O(C_pH_{2p}O)_xR^3$; and

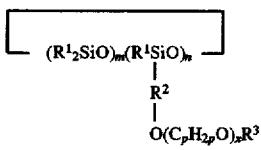

where $R^1$, $R^2$, $R^3$, p, and x are defined as above; m is an integer with a value from 0 to 8; n is an integer from 1 to 8; and m+n is an integer from 3 to 8.

The method for preparation of the polyoxyalkylene-modified organopolysiloxane according to my invention is explained in detail as follows.

The polyoxyalkylene-modified organopolysiloxane can be prepared by conducting a hydrosilylation reaction in an organic solvent between (A) a polyoxyalkylene bearing alkenyl at a single terminal, having a peroxide value not exceeding 3 meq/kg, and a total content of aldehyde plus ketone not exceeding 100 ppm by weight, and (B) an organohydrogenpolysiloxane that contains at least one silicon-bonded hydrogen atom in the molecule, in the presence of (C) a platinum catalyst; removing the organic solvent under reduced pressure; then blending in a quantity of water that is at least one weight percent of the total of components (A) and (B); subsequently eliminating the water under reduced pressure; and thereafter adding from 4 ppm to 800 ppm antioxidant, and optionally from 1 ppm to 500 ppm buffer having a pH from 5.5 to 8 when dissolved in water.

Polyoxyalkylene (A) is a precursor in preparation of polyoxyalkylene-modified organopolysiloxanes according to my invention. Examples of polyoxyalkylene (A) are compounds of general formula $LO(C_pH_{2p}O)_xR^3{}_2$ in which L is an alkenyl group such as vinyl or allyl; $R^3$ is a hydrogen atom, a lower alkyl such as methyl, ethyl, or propyl, or an acyl group; p is an integer with a value from 2 to 4; and x is an integer with a value from 1 to 100.

These compounds (A) are exemplified by:

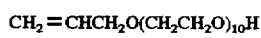

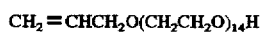

Compounds with general formulas below are examples of organohydrogenpolysiloxane (B):

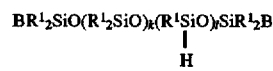

where $R^1$, k, and l are defined above, and B is $R^1$ or the hydrogen atom.

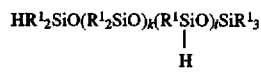

where $R^1$, k, and l are defined as above.

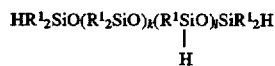

where $R^1$, k, and l are defined above.

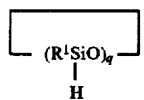

where $R^1$ is defined above and q is an integer with a value from 3 to 8.

Compounds of the following formula are preferred among the above organohydrogenpolysiloxanes:

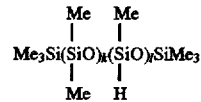

where Me is methyl, k is 0 or a positive integer, and l is a positive integer.

Polyoxyalkylene (A) and organohydrogenpolysiloxane (B) are addition reacted in organic solvent in the presence of a platinum catalyst (C) in the preparative method according to my invention. This reaction, known as a hydrosilylation reaction, consists of the addition of the alkenyl in component (B) to the silicon-bonded hydrogen in component (A).

This reaction is carried out in an organic solvent, i.e., component (D). The type of organic solvent is not critical as long as it s able to dissolve both components (A) and (B). The organic solvent is exemplified by ethanol, isopropyl alcohol, toluene, and xylene.

After the reaction, the organic solvent is removed under reduced pressure, from the product of the reaction of component (A) with component (B). After this solvent elimination step, a quantity of water, that is at least 1 weight % of the total of components (A) plus (B), is first mixed into the reaction product, and subsequently eliminated under reduced pressure.

The antioxidant is then mixed into the reaction product obtained. Admixture of the antioxidant is a characteristic feature of the preparative method according to my invention, and it is admixed at from 5 ppm to 1,000 ppm by weight.

The preparative method according to my invention can also include preliminary addition of a portion of antioxidant to the starting polyoxyalkylene (A), for maintaining stability of the polyoxyalkylene during the production process; in which case, 1 ppm to 200 ppm antioxidant is mixed into starting component (A).

A buffer can be used in my method on an optional basis. The function of the buffer is to stabilize the polyoxyalkylene-modified organopolysiloxane. The buffer should exhibit a pH from 5.5 to 8 when dissolved in water. It is exemplified by sodium citrate, potassium citrate, sodium acetate, potassium acetate, sodium phosphate, potassium phosphate, sodium borate, and potassium borate.

Because it is odor free and does not generate odor with the passage of time, the polyoxyalkylene-modified organopolysiloxane of the above-described preparative method is well suited for use as a base oil for cosmetics.

My invention is explained in greater detail below with reference to working examples. In the examples, % denotes weight percent and Me denotes the methyl group. The peroxide value, total aldehyde plus ketone, and odor were measured as follows.

Measurement of the Peroxide Value

A sample of approximately 1 g was weighed into a 200 mL Erlenmeyer flask equipped with a ground stopper. 10 mL chloroform was added and the sample was completely dissolved. 15 mL acetic acid was added and the flask was stoppered and then thoroughly shaken. The entire flask was then wrapped in aluminum foil for protection from light, 2 mL saturated methanolic potassium iodide solution was added, and the flask was held in the dark at ambient temperature for 30 minutes. This was followed by addition of 30 mL distilled water, and transfer of the free iodine into the aqueous layer. Approximately 0.2 g 10% starch solution was dripped in from a dropping pipette, and titration with N/100 sodium thiosulfate standard solution was then carried out until the aqueous layer became colorless. A blank test was run concurrently. The peroxide value was calculated from the equation:

$$\text{peroxide value (meq/kg)} = (A-B) \times F \times 10 \times (1/S)$$

where:
A is the number of milliliters of N/100 sodium thiosulfate standard solution consumed in the test on the sample;
B is the number of milliliters of N/100 sodium thiosulfate standard solution consumed in the blank test;
F is the titer of the N/100 sodium thiosulfate standard solution;
and S is the polyoxyalkylene-modified organopolysiloxane sample size.

Measurement of the Total Content of Aldehyde Plus Ketone 50 g of the sample was precisely weighed into a 100 mL beaker, and a solution of hydroxylamine hydrochloride (prepared by dissolving 50 g hydroxylamine in 150 mL pure water and bringing to 1 L with methanol), was added, using a whole pipette, followed by thorough mixing and then standing for 1 hour. After addition of 50 mL methanol with a graduated cylinder, potentiometric titration was carried out using N/10 methanolic potassium hydroxide standard solution from Kanto Kagaku Kabushiki Kaisha. A blank test was run simultaneously. The total content of aldehyde plus ketone (ppm) was calculated from the equation:

$$[(A-B) \times F \times 0.29]/S \times 10,000$$

where
A is the number of milliliters of N/10 methanolic potassium hydroxide standard solution consumed in the test on the sample;
B is the number of milliliters of N/10 methanolic potassium hydroxide standard solution consumed in the blank test;
F is the titer of the N/10 methanolic potassium hydroxide standard solution; and
S is the polyoxyalkylene-modified organopolysiloxane sample size.

Odor Measurement

Approximately 50 cc samples were placed in each of six 100 cc glass bottles, which were then held at quiescence for 2 hours in an oven at approximately 30° C. With one sample, an odor sensor (i.e., a metal oxide semiconductor sensor from Kalmor Company) was set in place as soon as the cap was opened, and the odor value was measured after 1 minute had elapsed.

With the other 5 samples, the odor was organoleptically evaluated by 5 investigators immediately after opening the bottle. The results of this evaluation were scored on the following 4-level scale:

+++ is almost odor-free, i.e., odor-free evaluation by at least 4 investigators;

++ is slight odor, i.e., slight odor determined by no more than 3 investigators;

+ is odor present, i.e., odor found by five investigators although in varying degrees; and x is pungent odor.

EXAMPLE 1

Natural vitamin E obtained by extraction (abbreviated below as extracted natural vitamin E) sufficient to provide 200 ppm, was mixed into a polyoxyalkylene allyl ether having a peroxide value of 2 meq/kg, total aldehyde plus ketone of 5.3 ppm, and the formula $CH_2=CHCH_2O(CH_2CH_2O)_{12}H$. 705 g of this polyoxyalkylene allyl ether, 295 g methylhydrogenpolysiloxane with the average compositional formula:

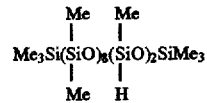

and 300 g isopropanol, were then mixed to homogeneity in a 2 L four-neck flask equipped with reflux condenser and thermometer. After 1 mL 2% isopropanolic chloroplatinic acid solution had been mixed to homogeneity into the mixture, a reaction was run for 4 hours under reflux. To eliminate unreacted Si-H, 100 g ethanol was then added with heating under reflux for another 2 hours. This was followed by distillation under reduced pressure to a maximum attained temperature of 120° C., and then cooling to 40° C. to give a reaction product 1. 20 g purified water, 0.2 g extracted natural vitamin E, and 5 g of a 2% methanolic sodium acetate solution were subsequently mixed into reaction product 1; which was then distilled under reduced pressure by heating to a maximum attained temperature of 110° C. Cooling afforded reaction product 2. Reaction product 2 was purified by filtration to give a polyoxyalkylene-modified dimethylpolysiloxane. The peroxide value, total content of aldehyde plus ketone, and odor, were measured for this polyoxyalkylene-modified dimethylpolysiloxane, using a sample taken immediately after preparation, and on a sample that had been stored for 30 days in an oven at 50°±3° C. These results are shown in Tables 1 and 2.

EXAMPLE 2

Extracted natural vitamin E sufficient to provide 200 ppm was mixed into a polyoxyalkylene allyl ether having a peroxide value of 2 meq/kg, total aldehyde plus ketone of 5.3 ppm, and the formula $CH_2=CHCH_2O(CH_2CH_2O)_{12}H$. 275 g of this polyoxyalkylene allyl ether, 725 g methylhydrogenpolysiloxane with the average compositional formula:

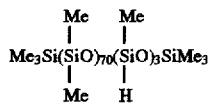

and 300 g isopropanol, were then mixed to homogeneity in a 2 L four-neck flask equipped with reflux condenser and thermometer. After 1 mL 2% isopropanolic chloroplatinic acid solution had been mixed to homogeneity into the mixture, a reaction was run for 4 hours under reflux. To eliminate unreacted Si-H, 100 g ethanol was then added with heating under reflux for another 2 hours. This was followed by distillation under reduced pressure to a maximum attained temperature of 120° C., and then cooling to 40° C., to provide reaction product 1.20 g purified water, 0.2 g extracted natural vitamin E, and 5 g of a 2% methanolic sodium acetate solution, were subsequently mixed into reaction product 1, which was then distilled under reduced pressure by heating to a maximum attained temperature of 110° C. Cooling afforded reaction product 2. Reaction product 2 was purified by filtration to give a polyoxyalkylene-modified dimethylpolysiloxane. The peroxide value, total content of aldehyde plus ketone, and odor, were measured for this polyoxyalkylene-modified dimethylpolysiloxane, on a sample taken immediately after preparation, and on a sample that had been stored for 30 days in an oven at 50°±3° C. The results are shown in Tables 1 and 2.

EXAMPLE 3

Extracted natural vitamin E sufficient to provide 200 ppm, was mixed into a polyoxyalkylene allyl ether having a peroxide value of 2 meq/kg, total aldehyde plus ketone of 5.3 ppm, and the formula $CH_2=CHCH_2O(CH_2CH_2O)_{12}H$. This polyoxyalkylene allyl ether, 236 g methylhydrogenpolysiloxane with the average compositional formula:

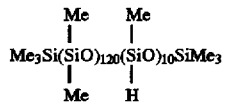

and 764 g isopropanol, were then mixed to homogeneity in a 2 L four-neck flask equipped with reflux condenser and thermometer. After 1 mL 2% isopropanolic chloroplatinic acid solution had been mixed to homogeneity into the mixture, a reaction was run for 4 hours under reflux. To eliminate unreacted Si-H, 100 g ethanol was then added with heating under reflux for another 2 hours. This was followed by distillation under reduced pressure to a maximum attained temperature of 120° C., and then cooling to 40 ° C., to provide reaction product 1.20 g purified water, 0.2 g extracted natural vitamin E, and 5 g of a 2% methanolic sodium acetate solution, were subsequently mixed into reaction product 1, which was then distilled under reduced pressure by heating to a maximum attained temperature of 110° C. Cooling afforded reaction product 2. Reaction product 2 was purified by filtration to provide a polyoxyalkylene-modified dimethylpolysiloxane. The peroxide value, total content of aldehyde plus ketone, and odor, were measured for this polyoxyalkylene-modified dimethylpolysiloxane on a sample taken immediately after preparation, and on a sample that had been stored for 30 days in an oven at 50°±3° C. These results are shown in Tables 1 and 2.

EXAMPLE 4

A polyoxyalkylene-modified dimethylpolysiloxane was prepared as in Example 1, but without addition of extracted natural vitamin E to reaction product 1. The properties of the resulting polyoxyalkylene-modified dimethylpolysiloxane were measured as in Example 1, and the results are shown in Tables 1 and 2.

EXAMPLE 5

A polyoxyalkylene-modified dimethylpolysiloxane was prepared as in Example 1, but neither extracted natural vitamin E nor the 2% methanolic sodium acetate solution were added to reaction product 1. The properties of the resulting polyoxyalkylene-modified dimethylpolysiloxane were measured as in Example 1, and the results are shown in Tables 1 and 2.

COMPARATIVE EXAMPLE 1

A polyoxyalkylene-modified dimethylpolysiloxane was prepared as in Example 1, but neither extracted natural vitamin E nor the 2% methanolic sodium acetate solution were added anywhere in the process. The properties of the resulting polyoxyalkylene-modified dimethylpolysiloxane were measured as in Example 1, and the results are shown in Tables 1 and 2.

TABLE 1

Results of evaluation immediately after preparation

|  | peroxide value | total aldehyde plus ketone | odor (sensor) | odor (organoleptic) |
|---|---|---|---|---|
| Example 1 | 1.8 | 3.0 | 220 | +++ |
| Example 2 | 0.8 | 2.4 | 170 | +++ |
| Example 3 | 1.5 | 10.5 | 280 | ++ |
| Example 4 | 5.0 | 20.0 | 360 | ++ |
| Example 5 | 5.8 | 23.0 | 350 | ++ |
| Comparative Example 1 | 10.0 | 56.0 | 700 | + |

TABLE 2

Results of evaluation after holding for 30 days at 50 ± 3° C.

|  | peroxide value | total aldehyde plus ketone | odor (sensor) | odor (organoleptic) |
|---|---|---|---|---|
| Example 1 | 2.0 | 6.5 | 210 | +++ |
| Example 2 | 0.8 | 2.8 | 180 | +++ |
| Example 3 | 2.5 | 13.5 | 295 | ++ |
| Example 4 | 8.0 | 30.0 | 460 | ++/+ |
| Example 5 | 15.8 | 80.0 | 550 | ++/+ |
| Comparative Example 1 | 21.0 | 300.3 | 1250 | x |

The polyoxyalkylene-modified organopolysiloxane according to my invention is odor-free. In particular, it generates almost no odor with elapsed time, since (i) it contains 5–1,000 ppm by weight of an antioxidant, (ii) it has a peroxide value not exceeding 5 meq/kg, and (iii) it has a total content of aldehyde plus ketone not exceeding 100 ppm. Moreover, the preparative method of my invention is characterized by its ability to produce such polyoxyalkylene-modified organopolysiloxanes in a highly efficient manner.

Other variations may be made in the compounds, compositions, and methods described herein, without departing from the essential features of my invention. The forms of my invention are exemplary only, and not intended as limitations on its scope, as defined in the appended claims.

I claim:

1. A method for preparing an organopolysiloxane bearing polyoxyalkylene bonded to silicon across alkylene comprising (i) conducting a hydrosilylation reaction in an organic solvent between (A) a polyoxyalkylene bearing alkenyl at a single terminal and having a peroxide value not exceeding 3 meq/kg, and a total content of aldehyde plus ketone not exceeding 100 ppm by weight; (B) an organohydrogenpolysiloxane that contains at least one silicon-bonded hydrogen atom in the molecule; in the presence of (C) a platinum catalyst;

(ii) removing the organic solvent under reduced pressure;

(iii) blending in an amount of water equivalent to at least one weight percent of the total amount of components (A) and (B);

(iv) eliminating the water under reduced pressure; and (v) adding 5–1,000 ppm of an antioxidant having the capacity to inhibit oxidation of the polyoxyalkylene, and optionally 1–500 ppm of a buffer having a pH of 5.5–8 when dissolved in water.

2. A method according to claim 1 wherein the polyoxyalkylene bearing alkenyl at a single terminal has the formula $LO(C_pH_{2p}O)_xR^3{}_2$ where L is alkenyl; $R^3$ is hydrogen, a lower alkyl group, or an acyl group; p is 2–4; and x is 1–100.

3. A method according to claim 2 wherein component (B) has the formula

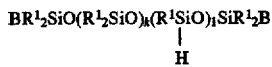

where $R^1$ is a monovalent hydrocarbon group; k is zero or a positive integer; l is zero or a positive integer; and B is $R^1$ or hydrogen.

4. A method according to claim 3 wherein the organic solvent is ethanol, isopropyl alcohol, toluene, or xylene.

5. A method according to claim 4 wherein the buffer is sodium citrate, potassium citrate, sodium acetate, potassium acetate, sodium phosphate, potassium phosphate, sodium borate, or potassium borate.

6. An organopolysiloxane bearing polyoxyalkylene bonded to silicon across alkylene prepared according to the method defined in claim 1 containing 5–1,000 ppm by weight of the antioxidant, having a peroxide value not exceeding 5 meq/kg, and a total content of aldehyde plus ketone not exceeding 100 ppm.

7. An organopolysiloxane bearing polyoxyalkylene bonded to silicon across alkylene according to claim 6 wherein the antioxidant is selected from the group consisting of vitamin $D_2$, vitamin $D_3$, vitamin $D_4$, vitamin E, 2,6-di-tert-butyl-p-cresol, 4,4-dihydroxyphenylisopropane, and 4,4-thiobis(6-tert-butyl-m-cresol).

8. An organopolysiloxane bearing polyoxyalkylene bonded to silicon across alkylene according to claim 6 having the formula

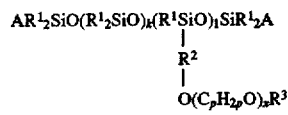

where $R^1$ is a monovalent hydrocarbon group; $R^2$ is alkylene; is $R^3$ is hydrogen, a lower alkyl group, or an acyl group; A is $R^1$ or the group $-R^2-O(C_pH_{2p}O)_xR^3$; k is zero or a positive integer; l is zero or a positive integer; p is 2–4; and x is 1–100; provided that when l is zero, at least one A is $-R^2-O(C_pH_{2p}O)_xR^3$.

9. An organopolysiloxane bearing polyoxyalkylene bonded to silicon across alkylene according to claim 6 having the formula

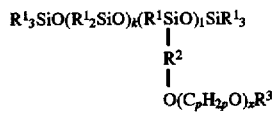

where $R^1$ is a monovalent hydrocarbon group; $R^2$ is alkylene; $R^3$ is hydrogen, a lower alkyl group, or an acyl group; k is zero or a positive integer; l is a positive integer; p is 2–4; and X is 1–100.

10. A method for preparing an organopolysiloxane bearing polyoxyalkylene bonded to silicon across alkylene comprising (i) conducting a hydrosilylation reaction in an organic solvent between (A) a blend of 1–200 ppm of an antioxidant and a polyoxyalkylene bearing alkenyl at a single terminal, the antioxidant having the capacity to inhibit oxidation of the polyoxyalkylene, the polyoxyalkylene having a peroxide value not exceeding 3 meq/kg, and a total content of aldehyde plus ketone not exceeding 100 ppm by weight; (B) an organohydrogenpolysiloxane that contains at least one silicon-bonded hydrogen atom in the molecule; in the presence of (C) a platinum catalyst;

(ii) removing the organic solvent under reduced pressure;

(iii) blending in an amount of water equivalent to at least one weight percent of the total amount of components (A) and (B);

(iv) eliminating the water under reduced pressure; and (v) adding 4–800 ppm of the antioxidant, and optionally 1–500 ppm of a buffer having a pH of 5.5–8 when dissolved in water.

11. A method according to claim 10 wherein the polyoxyalkylene bearing alkenyl at a single terminal has the formula $LO(C_pH_{2p}O)_xR^3{}_2$ where L is alkenyl; $R^3$ is hydrogen a lower alkyl group, or an acyl group; p is 2–4; and x is 1–100.

12. A method according to claim 11 wherein component (B) has the formula

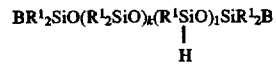

where $R^1$ is a monovalent hydrocarbon group; k is zero or a positive integer; l is zero or a positive integer; and B is $R^1$ or hydrogen.

13. A method according to claim 12 wherein the organic solvent is ethanol, isopropyl alcohol, toluene, or xylene.

14. A method according to claim 13 wherein the buffer is sodium citrate, potassium citrate, sodium acetate, potassium acetate, sodium phosphate, potassium phosphate, sodium borate, or potassium borate.

15. An organopolysiloxane bearing polyoxyalkylene bonded to silicon across alkylene prepared according to the method defined in claim 10 containing 5–1,000 ppm by weight of the antioxidant, having a peroxide value not exceeding 5 meq/kg, and a total content of aldehyde plus ketone not exceeding 100 ppm.

16. An organopolysiloxane bearing polyoxyalkylene bonded to silicon across alkylene according to claim 15 wherein the antioxidant is selected from the group consisting of vitamin $D_2$, vitamin $D_3$, vitamin $D_4$, vitamin E, 2,6-ditert-butyl-p-cresol, 4,4-dihydroxyphenylisopropane, and 4,4-thiobis(6-tert-butyl-m-cresol).

17. An organopolysiloxane bearing polyoxyalkylene bonded to silicon across alkylene according to claim 15 having the formula

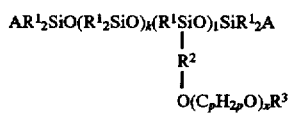

where $R^1$ is a monovalent hydrocarbon group; $R^2$ is alkylene; $R^3$ is hydrogen, a lower alkyl group, or an acyl group; A is $R^1$ or the group —$R^2$—$O(C_pH_{2p}O)_xR^3$; k is zero or a positive integer; l is zero or a positive integer; p is 2–4; and x is 1–100; provided that when l is zero, at least one A is —$R^2$—$O(C_pH_{2p}O)_xR^3$.

18. An organopolysiloxane bearing polyoxyalkylene bonded to silicon across alkylene according to claim 15 having the formula

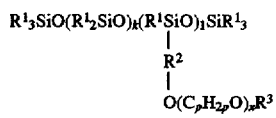

where $R^1$ is a monovalent hydrocarbon group; $R^2$ is alkylene; $R^3$ is hydrogen, a lower alkyl group, or an acyl group; k is zero or a positive integer; l is a positive integer; p is 2–4; and x is 1–100.

* * * * *